United States Patent [19]
Wildbolz

[11] 3,854,330
[45] Dec. 17, 1974

[54] APPARATUS FOR MEASURING MASS DENSITY VARIATIONS IN A STAPLE FIBER SLIVER ON SPINNING PREPARATORY MACHINES

[75] Inventor: Rudolf Wildbolz, Winterthur, Switzerland

[73] Assignee: Rieter Machine Works Ltd., Winterthur, Switzerland

[22] Filed: Apr. 13, 1973

[21] Appl. No.: 350,790

[30] Foreign Application Priority Data
May 10, 1972 Switzerland.......................... 6919/72

[52] U.S. Cl. .................................. 73/160, 73/37.7
[51] Int. Cl. ...................... G01n 9/00, G01n 33/36
[58] Field of Search ...................... 73/37.5, 60, 37.7; 33/DIG. 2

[56] References Cited
UNITED STATES PATENTS

| | | | |
|---|---|---|---|
| 3,056,280 | 10/1962 | Brewer et al. | 73/37.5 |
| 3,171,275 | 3/1965 | Miller | 73/37.5 |
| 3,752,170 | 8/1973 | Murbach | 73/160 |

*Primary Examiner*—S. Clement Swisher
*Attorney, Agent, or Firm*—Werner W. Kleeman

[57] ABSTRACT

Apparatus for measuring mass density variations in a staple fiber sliver on spinning preparatory machines, comprising a sliver funnel having a throughput duct which converges in the direction of material flow. The sliver funnel comprises centrally symmetrical members which are radially elastically deflectable and which condense from all sides the fiber sliver passing therethrough. One or a number of highly sensitive detectors for detecting variations of the fiber mass are associated with such members of the sliver funnel and each detector transmits a signal to an amplifier corresponding to the deflection of the deflectable members.

12 Claims, 2 Drawing Figures

APPARATUS FOR MEASURING MASS DENSITY VARIATIONS IN A STAPLE FIBER SLIVER ON SPINNING PREPARATORY MACHINES

BACKGROUND OF THE INVENTION

The present invention relates to a new and improved apparatus for measuring mass density variations in a staple fiber sliver on spinning preparatory machines, such as cards, draw-frames or similar types of machines.

During spinning it is of great importance to provide reliable measuring methods for determining the mass per unit length of a staple fiber sliver, for example fiber web layers or a card or draw-frame sliver, in order to be able to level out any possibly present irregularities during appropriate processing stages.

The capacitive measuring techniques heretofore employed are unsatisfactory since humidity variations in the textile material to be checked have resulted in false measurement results. The same also holds true for optical measuring systems which detect the absorption of a light beam, yet such however depends to a large extent upon the color properties of the textile material to be controlled. The use of radioactive rays has also already been proposed, but thus far this technique has not been readily accepted due to the expensive arrangements which are needed and the insufficient measuring precision which can be attained.

The newest developments tend toward the use of pneumatic measuring principles, the fiber sliver being pulled through a converging trumpet and the static pressure prevailing in the converging zone corresponding to the fiber sliver density being used as a measuring indicator. Such trumpets, considered most reliable thus far, however also exhibit considerable disadvantages, since together with the air necessarily entering the measuring duct there also penetrate therein impurities which accummulate in the measuring duct and impair the measurement results. Corrective measures employing periodic pressure blasts or surges blown in the direction of the trumpet are not satisfactory as their cleaning action is not always effective, and further, the measuring duct system must be equipped with a device for generating these periodic air blasts. A further disadvantage of the pneumatic measuring principle resides in its dependency not only upon the fineness of the individual fibers in the sliver (a deviation of 0.1 Micronaire results in a deviation of the measured sliver weight of 1 percent to 1.5 percent, but also upon the throughout speed of the fiber material, since such is influenced by the static pressure. Hence, it has been found necessary, for instance, in an arrangement for controlling and measuring at the delivery point of a drafting system, to provide a speed compensating device which can, however, compensate speed variations only within the normal levelling or regulation range and furthermore results in a considerably more complicated arrangement.

It also has been attempted to eliminate the disadvantage of the clogging of the measuring duct by detecting the vacuum prevailing in an expanding trumpet so that no impurities can penetrate into the measuring duct. This arrangement, however, resulted in a certain loss of the measuring sensitivity.

Further, it has been proposed to condense the fiber sliver by means of a sliver trumpet or funnel into a flat or rectangular cross-section and to mechanically detect the thickness of the sliver emerging from the funnel by means of one or two spring-loaded detectors. Cross-section shapes deviating from the ideal, i.e., circular shape, however possess the disadvantage that their fiber mass distribution is more irregular, which unavoidably results in faulty measurements. Furthermore, after the condensing process a fiber arrangement or assembly, which cannot freely expand upon leaving the funnel but is strongly influenced by the retaining forces of the funnel exit or outlet and by the clamping and pulling forces of the pair of delivery rolls necessarily arranged in close vicinity to the funnel exit, cannot yield reliable measuring results. Also a funnel with a detector arranged outside of the funnel cannot be placed close enough to the subsequent situated rolls, so that the need for additional space has a negative effect.

SUMMARY OF THE INVENTION

Hence, it is a primary object of the present invention to eliminate these disadvantages and to create a simple, self-cleaning and space-saving measuring apparatus which is neither dependent upon the throughput speed nor disturbance-prone, is free of the above-mentioned Micronaire influence, highly sensitive, and even at high throughput speeds can readily follow the mass variation of the sliver, i.e., functions practically without inertia.

Another object of the invention aims at providing a measuring apparatus of the character described which is capable of reducing the influence of variations of bulkiness and crimp in the fiber sliver upon the measurement result.

Yet a further object of this invention is to increase the measuring range and the measuring precision of the measuring apparatus, and to reduce the cost of manufacturing such measuring apparatus.

A further object is to provide measuring apparatus of the character described which reliably satisfies the requirement of easy exchange if other measuring ranges are chosen for other sliver weights.

The present invention eliminates the aforementioned disadvantages and achieves the above-mentioned objectives in that there is proposed an apparatus for measuring the mass variations of a fiber sliver on spinning preparatory machines which comprises a sliver funnel having a throughput duct which converges in the direction of the material flow. The sliver funnel embodies centrally symmetrical members which are radially elastically deflectable and which condense from all sides the fiber sliver passing therethrough. One or a plurality of highly sensitive detectors for detecting variations of the fiber mass are associated with such elastically deflectable members and each such detector transmits a signal to an amplifier and which signal corresponds to the deflection of the deflectable members. Each individual detector can be provided with an air outlet nozzle which is arranged in such close vicinity to the member that the member acts as an impact plate of a pneumatic micrometer which is formed in this manner.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
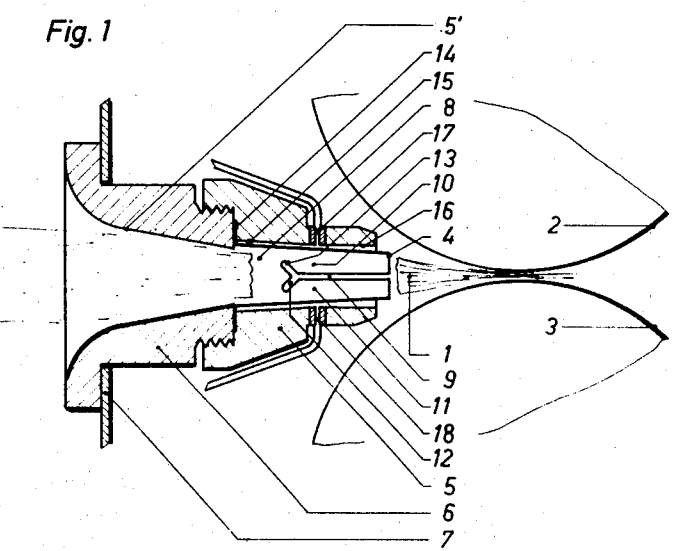
FIG. 1 is a longitudinal cross-sectional view of a mounted sliver funnel arrangement of the measuring apparatus designed according to the invention.

Describing now the drawing in the converging room or space of two rolls 2 and 3 forming a nip for a throughpassing fiber sliver 1 and which can be part of, for instance, a drafting arrangement or a card sliver depositing arrangement there is arranged a thin-walled sliver funnel 4 in a housing 5. This housing 5 is mounted via a support 6 provided with an increasingly conical sliver input duct 5' on the machine frame 7. The sliver funnel 4 is provided with a slightly conical portion 8 which is separated by two slots 9, which extend over the major part of the length of the funnel 4 in a median plane, into two substantially centrally symmetric members forming two elastic tongues 10, 11. In order to facilitate radial deflection of these tongues 10, 11 the wall cross-section is reduced in a certain zone located closer to the funnel input or inlet by having each slot 9 extend or terminate in fork-like extension slots 12, 13. At this location there is thus created a zone of maximum bending.

Figure 2:
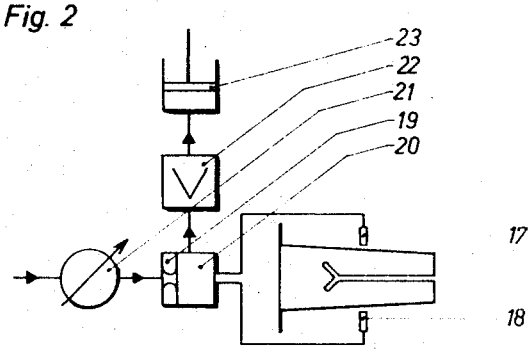
FIG. 2 is a circuit diagram of the measuring apparatus.

The funnel 4 furthermore is provided with a mounting flange 14 centered on the housing 5 and held fixedly clamped thereon by means of the threadably connected support 6. The housing 5 is provided with a conical bore 15, the taper of which slightly exceeds that of the funnel 4 and which bore 15 merges at its outer part into a cylindrical or substantially cylindrical bore 16. The diameters of the bores 15 and 16 are chosen in such manner that a small clearance is maintained with respect to the outside wall of the funnel 4 so that the tongues 10, 11 can be freely deflected and to further provide the possibility that funnels of different taper can be mounted. At the region of the tongues 10, 11 and following the zone of maximum bending - as seen in the direction of flow of the fiber material - there are arranged at the housing 5 two diametrically oppositely situated pneumatic outflow or outlet nozzles 17 and 18 which extend in radial direction, the mouth of each of which is in close vicinity to the associated tongues 10 and 11 respectively. Together with the tongues 10, 11 there is thus formed a respective pneumatic micrometer, each of which functions according to the impact plate principle. The circuit arrangement for these outflow nozzles 17 and 18 is shown in FIG. 2, each nozzle being connected to an input throttle 19 and to a vessel 20 acting as an antechamber into which air is supplied via a reduction or reducing valve 21 and which is connected with a pneumatic amplifier 22. The amplifier output signal can, for instance, directly activate a control piston 23 acting as a correcting member.

The aforedescribed apparatus functions as follows:

The fiber sliver 1 pulled through by the rolls 2 and 3 and which exhibits a certain bulk depending on the degree of fiber parallelization and crimp, is already precondensed somewhat by the input duct 5' whereupon it passes through the throughput duct of the funnel 4 where it is further condensed at all sides owing to the taper of such funnel. These radial condensing forces acting from all sides cause corresponding reactions upon the tongues 10, 11 which cause the tongues 10, 11 to spread more or less apart, depending on the fiber mass passing through at any given moment. In this manner the air outflow cross-section of the nozzles 17 and 18 is changed so that a pressure variation is caused in the antechamber 20, which then is transmitted by the amplifier 22 as an amplified pneumatic signal corresponding to the fiber mass passing through, which signal e.g. directly adjusts the position of the piston 23.

The arrangement described results in the following advantages:

Since the measuring funnel 4 and the pneumatic micrometers in the housing 6 can be easily replaced by a measuring funnel of different taper and thus of other elastic properties -- the support 6 merely needs to be unscrewed for this purpose -- other measuring ranges can be chosen simply by mounting another funnel, without the need for further dismantling operations or having to disconnect cables. The pneumatic micrometers, furthermore, already respond even with deflections of the tongues in the order of a few 1/1,000 of a millimeter, and thus, can signal minute variations of the mass of the throughpassing fiber material. Furthermore, there is no danger of contamination of the micrometers as, on the one hand, the nozzles 17, 18 are not contacted by the fiber material passing through, and, on the other hand, also because a constant airstream emerges from the nozzles 17 and 18 and which assists the cleaning action, this airstream escaping through the bore 16. By suitably choosing the funnel material, e.g., brass-type alloys or stainless steel and the location and size of the slots and the wall thickness, the stiffness of the tongues can be determined, i.e., the characteristic frequencies of the tongues can be chosen so high that the sliver can pass at high speed, for example up to 600 meters per minute, without risk that too high inertia of the tongues would reduce the measuring sensitivity. An additional considerable advantage is seen in that the measuring result is independent of the sliver throughout speed, which is of great importance if detection and control are effected in the delivery zone of a drafting arrangement. This also proves advantageous during starting and stopping a machine, since during this time the measurement results which are obtained are also reliable. Furthermore, the delivery rolls cannot exert any detrimental effects on the measurement results, as the deflection of the tongues is caused by the varying reactions within the funnel itself. Also, the values measured are not impaired by variations on the thickness of the individual fibers, that is to say, independence of the Micronaire values is practically established. Also important is the fact that the funnel reacts much less to variations in fiber parallelization and fiber crimp as compared to any other measuring technique known thus far. The use of pneumatic micrometers furthermore presents the particular advantage that the pneumatically obtained signal can be directly amplified in a pneumatic amplifier and can be again transmitted pneumatically to a pneumatically activated control piston acting as a correcting member, with the result that there are avoided the errors unavoidably occurring during transformation of the signal into another type signal, for example into an electrical signal.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for measuring mass density variations in a staple fiber sliver on spinning preparatory machines, comprising a sliver funnel having a throughput duct converging in the direction of flow of the fiber material, said sliver funnel embodying substantially centrally symmetrical members which are radially elastically deflectable and serving to condense at all sides the throughpassing fiber sliver, amplifier means, at least one detector operatively connected with said amplifier means and with said deflectable members for transmitting a signal to said amplifier means which corresponds to the deflection of at least one of said deflectable members, said detector comprising an air outlet opening arranged in such close vicinity to an associated one of said deflectable members that said associated member acts as an impact plate for the thus formed pneumatic micrometer.

2. The apparatus as defined in claim 1, wherein each deflectable member has associated therewith at least one detector.

3. The apparatus as defined in claim 2, wherein each of said detectors possesses high detection sensitivity.

4. The apparatus as defined in claim 1, wherein each deflectable member is provided with an individual detector containing an air outlet nozzle, and said air outlet nozzles being connected in parallel.

5. The apparatus as defined in claim 1, wherein said deflectable members constitute integral components of the sliver funnel and are formed of an elastically flexible material.

6. The apparatus as defined in claim 5, wherein said elastically deflectable members incorporate slot means extending in a median plane over a major portion of the sliver funnel.

7. The apparatus as defined in claim 5, wherein said elastically deflectable members possess slot means extending in a median plane over a major portion of the sliver funnel, and the reduction of the cross-section is effected by branch slots extending from said slot means.

8. The apparatus as defined in claim 4, wherein said air outlet nozzles are arranged at diametrically opposed locations of the sliver funnel.

9. The apparatus as defined in claim 1, further including a vessel supplied by a pressure source via a throttle valve, said air outlet nozzle being operatively connected with said vessel, and said vessel being connected with said amplifier means.

10. An apparatus for measuring mass density variations in a staple fiber sliver on spinning preparatory machines, comprising a sliver funnel having a throughput duct converging in the direction of flow of the fiber material, said sliver funnel embodying substantially centrally symmetrical members which are radially elastically deflectable and serving to condense at all sides the throughpassing fiber sliver, amplifier means, at least one detector operatively associated with said amplifier means and with said deflectable members for transmitting a signal to said amplifier means which corresponds to the deflection of at least one of said deflectable members, said deflectable members containing a zone of reduced stiffness.

11. The apparatus as defined in claim 10, wherein said zone of reduced stiffness is formed by a reduction in the cross-section of the wall of the sliver funnel.

12. The apparatus as defined in claim 11, wherein each deflectable member contains a detector having an air outlet nozzle, and wherein said air outlet nozzles, viewed in the direction of fiber material transport, are arranged after the zone of reduced stiffness.

* * * * *